United States Patent [19]

Maus et al.

[11] Patent Number: 5,560,200
[45] Date of Patent: Oct. 1, 1996

[54] METHOD AND APPARATUS FOR FUNCTIONAL MONITORING OF A CATALYTIC CONVERTER

[75] Inventors: Wolfgang Maus; Helmut Swars; Rolf Brück, all of Bergisch Gladbach, Germany

[73] Assignee: Emitec Gesellschaft fuer Emissionstechnologie mbH, Lohmar, Germany

[21] Appl. No.: 484,522

[22] Filed: Jun. 7, 1995

Related U.S. Application Data

[63] Continuation of PCT/EP94/00477, Feb. 18, 1994.

[30] Foreign Application Priority Data

Mar. 18, 1993 [DE] Germany ............ 43 08 661.6

[51] Int. Cl.$^6$ ........................ F01N 3/20
[52] U.S. Cl. ........................ 60/274; 60/277
[58] Field of Search .................... 60/274, 277

[56] References Cited

U.S. PATENT DOCUMENTS

| | | | |
|---|---|---|---|
| 3,837,165 | 9/1974 | Arrigoni | 60/277 |
| 3,957,444 | 5/1976 | Goto | 60/277 |
| 5,339,628 | 8/1994 | Maus | 60/277 |
| 5,419,122 | 5/1995 | Tabe | 60/277 |

FOREIGN PATENT DOCUMENTS

| | | | |
|---|---|---|---|
| 2643739 | 3/1978 | Germany | 60/277 |
| 3516981 | 11/1986 | Germany | 60/277 |
| 188020 | 10/1984 | Japan | 60/277 |
| 60106 | 2/1992 | Japan | 60/277 |
| 1373826 | 11/1974 | United Kingdom | 60/277 |
| 9203643 | 3/1992 | WIPO | 60/277 |

*Primary Examiner*—Douglas Hart
*Attorney, Agent, or Firm*—Herbert L. Lerner; Laurence A. Greenberg

[57] ABSTRACT

A catalytic converter has a carrier structure and a catalytically active coating adhering to the carrier structure, and is disposed downstream of an internal combustion engine of a motor vehicle for cleaning exhaust gas. A method for functional monitoring of the catalytic converter includes determining a temperature of the catalytically active coating and/or of the structure of the catalytic converter at least at one location. A temperature of the exhaust gas is determined upstream of the at least one location of the catalytic converter. At least first derivatives over time of both temperature values are formed. A difference of the derivatives over time is formed. An instant after a start of the engine at which the difference changes its sign is ascertained. An apparatus for functional monitoring of the catalytic converter includes at least one measuring sensor for measuring a temperature of the carrier structure and/or of the catalytically active coating. At least one device determines an exhaust gas temperature. A differentiation circuit forms derivatives over time of the measured or determined temperatures. A subtraction circuit forms a difference between the two derivatives over time. A comparison circuit ascertains an instant at which the difference changes its sign.

23 Claims, 1 Drawing Sheet

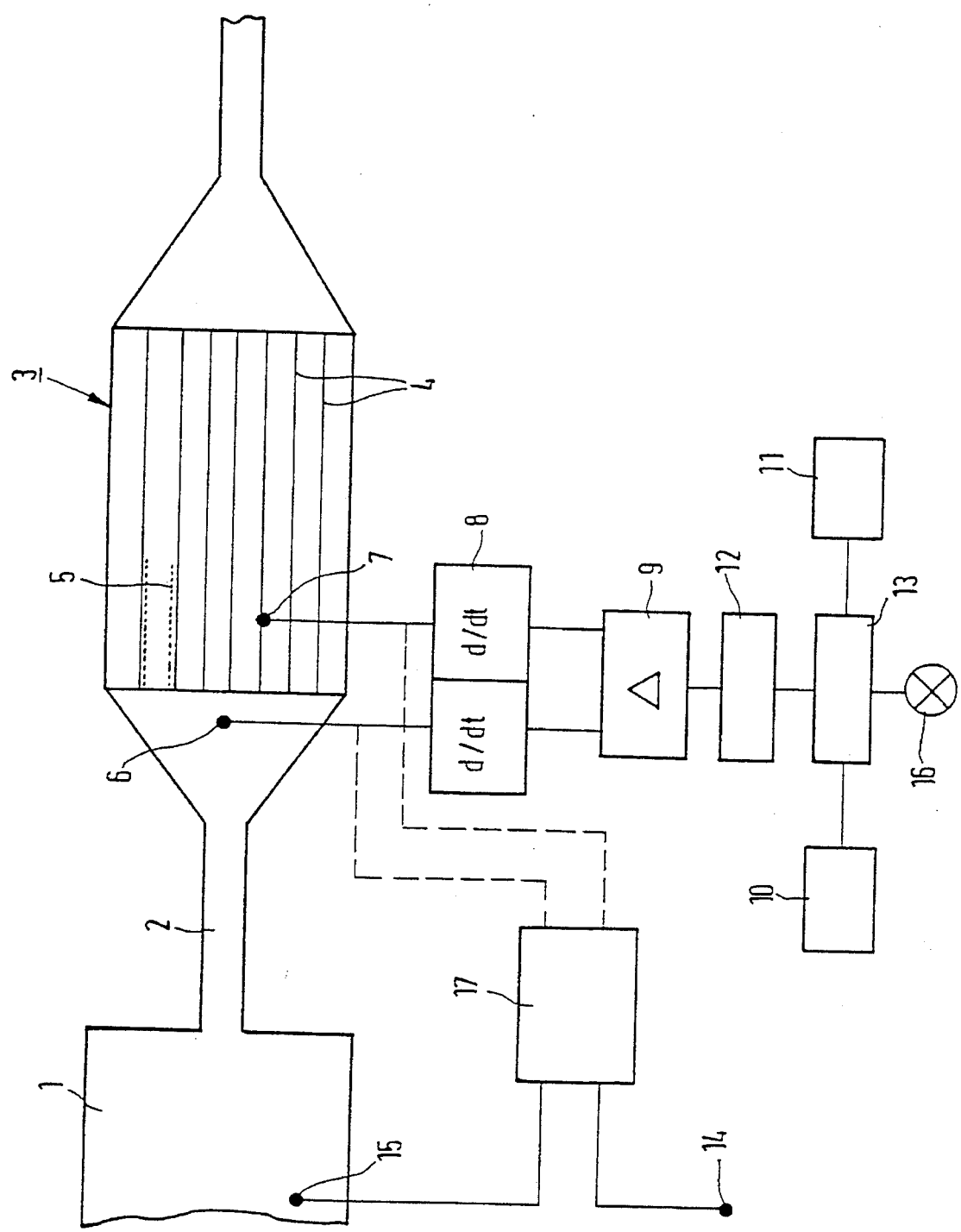

METHOD AND APPARATUS FOR FUNCTIONAL MONITORING OF A CATALYTIC CONVERTER

Cross-Reference to Related Application

This application is a Continuation of International Application Serial No. PCT/EP94/00477, filed Feb. 18, 1994.

BACKGROUND OF THE INVENTION

1. Field of the Invention

The present invention relates to a method and an apparatus for functional monitoring of a catalytic converter for cleaning exhaust gas. As emissions regulations become evermore stringent all over the world, it becomes necessary to monitor the function of catalytic converters in motor vehicles either constantly or at least periodically, so that if a catalytic converter can no longer perform its function that will be determined early.

International Patent Application WO 91/14855, corresponding to U.S. Pat. Nos. 5,255,511 and 5,307,626; and International Application WO 92/03643, corresponding to U.S. Pat. No. 5,355,671, disclose various configurations with temperature sensors that are used to monitor catalytic converters. Evaluation methods for the measured values attained with the measurement sensors are also described. The earlier measurement concepts have to do essentially with functional monitoring of a catalytic converter that is at an operating temperature, or in other words that is at a temperature markedly above the temperature at which the catalytic conversion begins. However, in view of stringent exhaust gas regulations for the total emissions of a motor vehicle, it has been found that catalytic converter performance in the cold starting phase, in particular, or in other words within the first minute after the starting of an internal combustion engine, plays an especially decisive role. In order to evaluate the functional capability of a catalytic converter, it is also important to know when the catalytic conversion in the catalytic converter begins, and possibly also at what temperature.

SUMMARY OF THE INVENTION

It is accordingly an object of the invention to provide a method and an apparatus for the functional monitoring of a catalytic converter, which overcome the hereinafore-mentioned disadvantages of the heretofore-known methods and apparatuses of this general type and in which the method also furnishes information regarding the performance of the catalytic converter in the cold starting phase.

With the foregoing and other objects in view there is provided, in accordance with the invention, a method for functional monitoring of a catalytic converter, having a carrier structure and a catalytically active coating adhering to the carrier structure, and being disposed downstream of an internal combustion engine of a motor vehicle for cleaning exhaust gas, which comprises determining a temperature of the catalytically active coating and/or of the structure of the catalytic converter at least at one location; determining a temperature of the exhaust gas upstream of the at least one location of the catalytic converter; forming at least first derivatives over time of both temperature values; forming a difference of the derivatives over time; and ascertaining an instant after a start of the engine at which the difference changes its sign.

Regardless of the way in which the temperature of the exhaust gas and of the catalytically active coating or of the structure of the catalytic converter is determined, the observation of the difference between the derivatives or derivations over time of these two temperature values furnishes an accurate statement of when the catalytic converter begins conversion. Since the catalytic conversion is exothermic, it heats up the catalytically active coating and the structure located directly beneath it. During the cold starting phase, the temperature of the exhaust gas initially rises more or less steadily and also proportionally heats up the catalytic converter. However, because of the thermal capacity of the catalytic converter, the temperature of the catalytically active coating and/or of the structure of the catalytic converter initially changes more slowly than does the temperature of the exhaust gas. However, the latter does change at the instant when the catalytic conversion begins. It is therefore possible to precisely determine this instant with the method of the invention. A conclusion can therefore be drawn by comparison with reference data or with a new catalytic converter as to the functional state of the catalytic converter, and in particular its cold starting performance.

Since the operation of a motor vehicle can still be quite variable in the cold starting phase, simply determining the instant after engine starting at which the difference changes its sign is not always conclusive enough.

Therefore, in accordance with another mode of the invention, it is especially advantageous to ascertain the temperature of the catalytically active coating and/or of the carrier structure at that instant, because that temperature permits a very accurate statement about the functionality of the catalytic converter. This temperature corresponds to the so-called lighting-off temperature, and in a poisoned or greatly aged catalytic converter it rises from initially approximately 350° to values of 400° to 450° C. In that temperature range, temperature measurements with typical temperature sensors, especially resistor wires, are still quite accurate and are relatively constant over long periods of time, so that good statements about the catalytic converter can be made.

In the case of metal carrier structures, the temperature of the carrier only slightly deviates from that of the catalytically active coating because of the low thermal capacity, so that a measuring sensor integrated into the carrier structure practically measures the temperature of the catalytically active coating at the same time. Suitable configurations for temperature sensors are known, for instance, from German Published, Non-Prosecuted Application DE 41 29 839 A1, or from the aforementioned International Patent Application WO 91/14855, corresponding to U.S. Pats. Nos. 5,255,511 and 5,307,626. In ceramic carrier structures, it may be necessary under some circumstances to place temperature sensors on their surface, or between the ceramic carrier and the catalytically active coating, in order to perform the measurement as close as possible to the heat source (that is, the region in which the catalytic reaction takes place).

In accordance with a further mode of the invention, in the case of metal carrier structures, the temperature of the carrier structure of the catalytic converter is measured directly by at least one measuring sensor that is integrated onto or into the carrier structure. Generally, in order to prevent uneven distributions of the flow profile and uneven catalytic activity of the converter from affecting the measurement, the measurement is performed integrally over at least a portion of the cross section and/or over of the length of the catalytic converter. Elongated temperature sensors that are located in a certain cross-sectional region, or temperature sensors extending longitudinally through the catalytic converter, or combinations of the two, as well as temperature sensors that extend diagonally through the catalytic converter, can all be used. What is important is that these temperature sensors primarily measure the temperature of the heat source, that is of the catalytically active coating or of the carrier structure which is directly in contact with it, rather than primarily measuring the gas temperature.

It would be most advantageous for the method of the invention if, at the same time that the temperature of the catalytically active coating or of the carrier structure is determined, the gas temperature in the immediate vicinity of this measurement point or measurement region could also be determined. However, this meets with technical difficulties, since it is almost impossible to measure purely the gas temperature in the interior of a catalytic converter. On one hand, the interstices between the carrier structure are mechanically too small, and on the other hand, the radiation from the catalytically active coating might possibly adulterate the measured values of the gas temperature.

In accordance with an added mode of the invention, the temperature of the exhaust gas is therefore preferably measured directly by at least one measuring sensor in the exhaust gas stream between the engine and the catalytic converter. In any case, it is important that the measurement be done upstream of the point where the temperature of the catalytically active coating or of the carrier structure is measured.

In accordance with an additional mode of the invention, it is also possible to determine the gas temperature from various measured values that are measured in any case to control the engine.

In accordance with yet another mode of the invention, the temperature of the exhaust gas is determined from the temperature of the engine, the rpm, and the air and fuel quantities supplied.

When the temperature of the catalytically active coating rises after the onset of catalytic conversion, and the derivative over time of this temperature is greater than the derivative over time of the exhaust gas temperature, a conclusion can be drawn as to the status of the catalytic converter. In accordance with yet a further mode of the invention, the conclusion is drawn from the absolute magnitude of the difference between the two derivatives over time, under fixed, known operating conditions, in particular by a comparison with command or set-point values and by determining the deviation from predetermined command values.

In accordance with yet an added mode of the invention, since a first portion of the catalytic converter generally reaches a necessary temperature for the catalytic reaction soonest in the cold starting phase, the temperature of the carrier structure and/or of the catalytically active coating of the catalytic converter is measured integrally over the length of this first portion of the catalytic converter.

In accordance with yet an additional feature of the invention, the temperature is measured approximately representatively over a cross-sectional region of the catalytic converter, and preferably over a cross-sectional region within the first 3 to 10 cm inside the carrier structure of the catalytic converter.

Among others, the advantage of observing the derivatives over time is that the absolute accuracy of the temperature sensor is not critical. In any case, in the temperature range up to approximately 500° C. that is decisive in that case, this accuracy is still quite high, and it does not decrease markedly until in the range above 800° C. Unlike the situation when monitoring a catalytic converter that is at the operating temperature, the observation of absolute temperatures within the context of the present invention is therefore an accurate measuring method, especially for ascertaining the lighting-off temperature of the catalytic converter.

In this situation, in order to increase the accuracy of the temperature sensors in the catalytic converter even further, in accordance with again another mode of the invention, they are recalibrated by comparison and readjustment and compared with other temperature sensors of the motor vehicle. An ambient temperature sensor or a coolant sensor of a motor vehicle are not exposed to high temperatures and are therefore stable over long periods of time, so that they offer a good reference for recalibration purposes. If the vehicle was parked for a relatively long period, for instance over night, then it can be assumed that all of the temperature sensors are at the same temperature.

With the objects of the invention in view, there is also provided an apparatus for functional monitoring of a catalytic converter, having a carrier structure and a catalytically active coating adhering to the carrier structure, and being disposed downstream of an internal combustion engine of a motor vehicle for cleaning exhaust gas, comprising at least one measuring sensor for measuring a temperature of the carrier structure and/or of the catalytically active coating; at least one device for determining an exhaust gas temperature; a differentiation circuit connected to the at least one measuring sensor and to the at least one device, for forming derivatives over time of the measured or determined temperatures; a subtraction circuit connected to the differentiation circuit for forming a difference between the two derivatives over time; and a first comparison circuit connected to the subtraction circuit for ascertaining an instant at which the difference changes its sign.

In accordance with another feature of the invention, since the monitoring is intended not only to bring about an immediate indication of a functional problem of the catalytic converter but also to enable accurate diagnosis in a repair facility, it is especially advantageous if a first memory device is present that stores the measured temperature value of the catalytically active coating and/or of the carrier structure, at the instant at which the difference changes its sign.

In accordance with a concomitant feature of the invention, there is provided a second memory device for storing command values and/or values measured earlier for this measured temperature value, and a second comparison circuit or device for comparing this measured temperature value with command values and/or values measured earlier, which further contributes to accurate diagnosis of the status of the catalytic converter and can even be used to predict how much remaining useful life it has.

Other features which are considered as characteristic for the invention are set forth in the appended claims.

Although the invention is illustrated and described herein as embodied in a method and an apparatus for functional monitoring of a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The figure of the drawing includes a fragmentary, diagrammatic, side-elevational view of an engine and a catalytic converter, as well as a schematic circuit diagram, of one exemplary embodiment of an apparatus according to the invention.

DESCRIPTION OF THE PREFERRED EMBODIMENTS

Referring now to the single figure of the drawing in detail, there is seen an engine 1 from which an exhaust gas line 2 leads to a catalytic converter 3. The catalytic converter 3 includes a carrier structure 4, to which a catalytically active coating 5 adheres. A temperature sensor 6 is disposed in such a way that it measures a temperature Tg of the exhaust gas as close as possible upstream of a measurement location or point 7 in the catalytic converter, without being affected by thermal radiation at that location. The measurement location 7 is a point-type or preferably areal-type temperature sensor, that measures a temperature Tk of the carrier structure 4, which generally very accurately matches the temperature of the catalytically active coating 5, if the carrier structure is formed of metal.

A differentiation apparatus 8 forms derivatives over time d/dt of the measured values Tg, Tk from the temperature sensors 6 and 7, and a subtraction circuit 9 forms a difference (d/dt Tk−d/dt Tg) from these two derivatives over time. A first comparison circuit 12 ascertains when the sign of the difference changes. If the first comparison circuit 12 ascertains such a sign change, then a temperature Tki being measured at that instant ti at the measurement location 7 is stored in a first memory device 10. Temperature measurement values that were measured earlier and/or command values are stored in a second memory device 11. A second comparison circuit or device 13 compares the earlier stored values or the command values with the temperature values stored in the first memory 10, and if excessive deviations are found it leads to a display 16, which indicates a malfunction of the catalytic converter. Instead of a display or in addition thereto, an electronic memory can be used, which is later read out for diagnostic purposes in a repair facility.

In order to increase the accuracy of the monitoring device, a recalibration circuit 17 is provided, which compares measured temperature values of an ambient temperature sensor 14, a coolant temperature sensor 15 and the temperature sensors 6 and 7 with one another after the motor vehicle has been parked for a relatively long period, and recalibrates the sensors 6 and 7 if necessary.

The present invention serves the purpose of early detection of functional problems in a catalytic converter in a motor vehicle, and in particular it makes it possible to ascertain a worsening of the lighting-off performance, which is important for total emissions.

We claim:

1. A method for functional monitoring of a catalytic converter, having a carrier structure and a catalytically active coating adhering to the carrier structure, and being disposed downstream of an internal combustion engine of a motor vehicle for cleaning exhaust gas, which comprises:

a. determining a temperature of at least one of the catalytically active coating and the structure of the catalytic converter at least at one location;

b. determining a temperature of the exhaust gas upstream of the at least one location of the catalytic converter;

c. forming at least first derivatives over time of both temperature values;

d. forming a difference of the derivatives over time; and e. ascertaining an instant after a start of the engine at which the difference changes its sign.

2. The method according to claim 1, which comprises measuring the temperature of at least one of the catalytically active coating and the carrier structure at the instant at which the difference changes its sign.

3. The method according to claim 1, which comprises directly measuring the temperature of the carrier structure of the catalytic converter with at least one measuring sensor being integrated at the carrier structure of the catalytic converter.

4. The method according to claim 3, which comprises integrating the at least one measuring sensor onto the carrier structure of the catalytic converter.

5. The method according to claim 3, which comprises integrating the at least one measuring sensor into the carrier structure of the catalytic converter.

6. The method according to claim 3, which comprises integrally measuring over at least a portion of at least one of the cross section and the length of the catalytic converter with the measuring sensor.

7. The method according to claim 1, which comprises directly measuring the temperature of the exhaust gas with at least one measuring sensor in an exhaust gas stream between the engine and the catalytic converter.

8. The method according to claim 1, which comprises determining the temperature of the exhaust gas from various measured values being measured anyway for controlling the engine.

9. The method according to claim 8, which comprises determining the temperature of the exhaust gas from the temperature of the engine, rpm, and quantities of air and fuel supplied.

10. The method according to claim 1, which comprises determining an absolute magnitude of the difference among the derivatives over time under fixed, known operating conditions and monitoring the absolute magnitude for deviations from command values.

11. The method according to claim 1, which comprises measuring at least one of the temperature of the carrier structure and the catalytically active coating of the catalytic converter integrally over a length of a first portion of the catalytic converter.

12. The method according to claim 1, which comprises measuring the temperature approximately representatively over a cross-sectional region of the catalytic converter.

13. The method according to claim 1, which comprises measuring the temperature approximately representatively over a cross-sectional region within a first 3 to 10 cm inside the carrier structure of the catalytic converter.

14. The method according to claim 3, which comprises recalibrating the at least one measuring sensor from time to time after the engine has been off for a relatively long period.

15. The method according to claim 3, which comprises recalibrating the at least one measuring sensor from time to time after the engine has been off for a relatively long period, by comparison with an ambient temperature sensor and suitable recalibration.

16. The method according to claim 3, which comprises recalibrating the at least one measuring sensor from time to time after the engine has been off for a relatively long period, by comparison with a coolant sensor of the motor vehicle and suitable recalibration.

17. The method according to claim 7, which comprises recalibrating the at least one measuring sensor from time to time after the engine has been off for a relatively long period.

18. The method according to claim 7, which comprises recalibrating the at least one measuring sensor from time to time after the engine has been off for a relatively long period, by comparison with an ambient temperature sensor and suitable recalibration.

19. The method according to claim 7, which comprises recalibrating the at least one measuring sensor from time to time after the engine has been off for a relatively long period, by comparison with a coolant sensor of the motor vehicle and suitable recalibration.

20. In an apparatus for functional monitoring of a catalytic converter, having a carrier structure and a catalytically active coating adhering to the carrier structure, and being disposed downstream of an internal combustion engine of a motor vehicle for cleaning exhaust gas, the improvement comprising:

a. at least one measuring sensor for measuring a temperature of at least one of the carrier structure and the catalytically active coating;

b. at least one device for determining an exhaust gas temperature;

c. a differentiation circuit connected to said at least one measuring sensor and to said at least one device, for forming derivatives over time of the measured and determined temperatures;

d. a subtraction circuit connected to said differentiation circuit for forming a difference between the two derivatives over time; and e. a comparison circuit connected to said subtraction circuit for ascertaining an instant at which the difference changes its sign.

21. The apparatus according to claim 20, including a memory device connected to said comparison circuit for storing a measured temperature value of at least one of the catalytically active coating and the carrier structure at the instant at which the difference changes its sign.

22. The apparatus according to claim 21, including another memory device connected to said comparison circuit for storing at least one of command values and earlier-measured values of the measured temperature value at the instant at which the difference changes its sign.

23. The apparatus according to claim 20, including:

a comparison device connected to said comparison circuit;

a first memory device connected to said comparison device for storing a measured temperature value of at least one of the catalytically active coating and the carrier structure at the instant at which the difference changes its sign; and a second memory device connected to said comparison device for storing at least one of command values and earlier-measured values of the measured temperature value at the instant at which the difference changes its sign;

said comparison device comparing the measured temperature value at the instant at which the difference changes its sign with at least one of the command values and earlier-measured values.

* * * * *